United States Patent [19]

Harwood et al.

[11] Patent Number: 5,728,476
[45] Date of Patent: Mar. 17, 1998

[54] FLOOR COVERINGS

[75] Inventors: Ivor Charles Harwood, Hinckley; Gary John Wilson, Coventry, both of United Kingdom

[73] Assignee: The Amtico Company Limited, Coventry, United Kingdom

[21] Appl. No.: 617,861

[22] PCT Filed: Sep. 19, 1994

[86] PCT No.: PCT/GB94/02035

§ 371 Date: Mar. 20, 1996

§ 102(e) Date: Mar. 20, 1996

[87] PCT Pub. No.: WO95/08593

PCT Pub. Date: Mar. 30, 1995

[30] Foreign Application Priority Data

Sep. 20, 1993 [GB] United Kingdom ............ 9319396
Oct. 17, 1993 [GB] United Kingdom ............ 9320651

[51] Int. Cl.$^6$ ............ B32B 27/00; B32B 31/20
[52] U.S. Cl. ............ 428/500; 428/515; 428/516; 428/521; 428/522; 428/523; 428/159; 428/204; 428/908.8; 525/919; 156/275.5; 156/308.2; 156/311
[58] Field of Search ............ 428/203, 204, 428/500, 521, 522, 523, 159, 515, 516, 908.8; 525/919; 156/308.2, 275.5, 311

[56] References Cited

U.S. PATENT DOCUMENTS

| | | |
|---|---|---|
| 2,773,851 | 12/1956 | Tolman. |
| 3,264,272 | 8/1966 | Rees. |
| 3,322,734 | 5/1967 | Rees. |
| 3,749,629 | 7/1973 | Andrews et al. ............ 156/276 |
| 3,979,540 | 9/1976 | Moffett ............ 428/189 |
| 4,187,131 | 2/1980 | Shortway et al. ............ 156/79 |
| 4,230,759 | 10/1980 | Kauffman et al. ............ 428/159 |
| 4,273,819 | 6/1981 | Schmidle et al. ............ 428/159 |
| 4,333,981 | 6/1982 | Winfield et al. ............ 428/215 |
| 4,614,556 | 9/1986 | Fry et al. ............ 156/78 |
| 4,824,726 | 4/1989 | Closson, Jr. ............ 428/349 |
| 5,188,654 | 2/1993 | Manalastas et al. ............ 71/28 |
| 5,316,861 | 5/1994 | Marchal et al. ............ 428/516 |
| 5,458,953 | 10/1995 | Wang et al. ............ 428/195 |

FOREIGN PATENT DOCUMENTS

| | | |
|---|---|---|
| 0146349 | 6/1985 | European Pat. Off.. |
| 0381971 | 8/1990 | European Pat. Off.. |
| 0413912 | 4/1994 | European Pat. Off.. |
| 56-22869 | 3/1981 | Japan. |
| 56-73178 | 6/1981 | Japan. |
| 57-15922 | 1/1982 | Japan. |
| 88013832 | 3/1988 | Japan. |
| 1216115 | 8/1989 | Japan. |
| 91079181 | 12/1991 | Japan. |
| 5177794 | 7/1993 | Japan. |
| 2019315 | 10/1979 | United Kingdom. |
| 2120266 | 11/1983 | United Kingdom. |
| WO 9219562 | 11/1992 | WIPO. |
| WO 9507178 | 3/1995 | WIPO. |

OTHER PUBLICATIONS

Encyclopedia of Polymer Science and Engineering, 8: 393–395 and 419 (1987).

Encyclopedia of Polymer Science and Engineering, 7: 233–247 (1987).

*Primary Examiner*—Marie Yaminitzky
*Attorney, Agent, or Firm*—Dann, Dorfman, Herrell and Skillman

[57] ABSTRACT

Resilient floor coverings are disclosed wherein the wear layer is a polymer composition, prepared from an ionomer resin and a polyfunctional olefinic compound, such as a polyfunctional acrylate. These floor coverings have good visual appearance and good burn, abrasion and stain resistance.

21 Claims, No Drawings

FLOOR COVERINGS

TECHNICAL FIELD

This invention relates to resilient floor coverings and to methods of making such floor coverings.

BACKGROUND ART

Resilient flooring coverings, which include for example vinyl tiles and vinyl sheet, are well known. They are described for example in an article entitled "Flooring Materials" in Encyclopedia of Polymer Science and Engineering, Wiley-Interscience, Volume 7 (1987), pages 233–247. Such floor coverings, as described in that article, are composite materials which comprise a transparent or translucent wear (upper) layer, a decorative layer such as a printed patterned layer and one or more backing (lower) layers. The wear layer of a resilient vinyl floor covering according to that article consists of a plasticised PVC composition. The printed patterned layer may for example be a printed acrylic or PVC film. The backing layer adjacent such a printed patterned layer commonly contains one or more white or other coloured pigments to enhance the appearance of the printed patterned layer as seen through the wear layer, and this type of backing layer may be called a face ply. Such composite floor coverings are commonly laminates, the composition of each layer in the laminate being chosen so as to provide a desired balance of physical properties both in that layer and in the floor covering as a whole. Resilient floor coverings are also known which comprise a decorative, for example pigmented, opaque vinyl wear layer laminated to one or more backing layers.

Vinyl floor coverings have enjoyed considerable commercial success but suffer from a number of disadvantages. Plasticised PVC is slightly yellow in colour, and it tends to become more yellow on exposure to the amounts of UV light normally occurring in interior environments. The clarity and visual appearance of a plasticised PVC wear layer and the visual appearance of a decorative layer such as a printed patterned layer through a transparent or translucent wear layer are therefore not as good as could be desired. The resistance of vinyl floor coverings to wear, abrasion, scratching and scuffing is not as great as could be desired. Vinyl floor coverings are marred by exposure to heat, for example lit cigarettes. The use of vinyl floor coverings has been objected to on environmental grounds, both in that they contain the chlorinated polymer PVC and in that they contain volatile organic compounds as plasticisers.

JP-A-56-073,178, JP-A-57-015,922 and GB-A-2,120,266 describe methods of manufacturing floor coverings in which a PVC composition comprising a polyfunctional monomer is formed into a wear layer which is then exposed to ionising (electron beam) radiation to induce crosslinking. Such floor coverings are said to exhibit improved cigarette burn resistance.

Ionomer resins which are thermoplastic copolymers based on an olefin and an alpha, beta-unsaturated carboxylic acid are well-known. They are described for example in an article entitled "Ionic Polymers" in Encyclopedia of Polymer Science and Engineering, Wiley-Interscience, Volume 8 (1987), pages 393–423. They are available commercially, for example from Du Pont under the Trade mark "Surlyn". Many grades of such resins are available commercially.

U.S. Pat. No. 4,083,824 states that the use of such ionomer resins in flooring compositions is severely restricted since they generally have disadvantageously low use temperatures and display extensive creep accompanied by a rapid decrease in modulus at normal room temperatures. Processing problems using ionomer resins are said to be severe due to their great tenacity for metal surfaces. U.S. Pat. No. 4,083,824 discloses a non-vinyl surface-covering composition comprising (a) a mineral filler dispersed throughout a binder comprising (b1) a copoly block acrylate and (b2) an ionomer resin. The weight ratio of the components (a), (b1) and (b2) disclosed in that reference is in the range 8–32:32–8:60 to 3–12:12–3:85.

GB-A-2,019,315 describes a method for making a dimensionally stable decorative floor covering in which a heated mass of thermoplastic material is hot calendered to form a sheet which is deposited on a conveyor. The sheet and conveyor are then heated, a pattern is deposited on the sheet from a preprinted transfer paper, a clear wear layer which may be of an ionomer resin is laminated over the pattern, and the surface of the wear layer is embossed by passage over engraved rollers. The resulting composite floor covering is cooled, stripped from the conveyor and cut into tiles which are then annealed.

U.S. Pat. No. 4,333,981 discloses an animal stall floor and wall covering which comprises a laminate of (a) a liquid-impermeable layer of an ionomer resin at least 125 micron (5 mil) thick superimposed upon (b) a foamed resin layer at least 5 mm (200 mil) thick. The aggregate density of layer (b) is preferably in the range 0.5 to 10.0. For an animal stall floor covering, it is stated that layer (a) is preferably 0.5 to 5 mm (20 to 200 mil) thick and layer (b) is preferably at least 20 mm (800 mil) thick.

DISCLOSURE OF THE INVENTION

The present invention provides a resilient floor covering which comprises a polymer composition wear layer and is characterised in that the polymer composition wear layer comprises an ionomer resin and a polyfunctional polymerisable olefinic compound. In one embodiment of the invention the wear layer is transparent or translucent and overlies a decorative layer, which can be seen through the wear layer. In another embodiment of the invention, the wear layer comprises a small proportion of coloured particles and is accordingly opaque.

The invention further provides a method of manufacturing a resilient floor covering including the step of laminating a wear layer to one or more underlying layers and characterised in that the wear layer is a polymer composition film which comprises an ionomer resin and a polyfunctional polymerisable olefinic compound.

MODES FOR CARRYING OUT THE INVENTION

The ionomer resin is a thermoplastic copolymer based on an olefin and an alpha,beta-unsaturated carboxylic acid, in which the carboxylic acid groups are at least partially neutralised by salt formation with a metal cation. The olefin may for example be propylene or preferably ethylene. The alpha,beta-unsaturated carboxylic acid may for example be acrylic acid or preferably methacrylic acid. The copolymer may in addition be based on smaller amounts of one or more other polymerisable olefinic monomers, for example esters of acrylic or methacrylic acid. The metal cation may for example be lithium, sodium or preferably zinc. Zinc-containing ionomer resins have been found to give good abrasion resistance in the floor coverings of the invention. Mixtures of two or more olefins and/or alpha, beta-unsaturated carboxylic acids and/or metal cations may be used. The wear layer of the floor coverings of the invention may comprise a single grade of resin or a blend of two or more grades of resin to provide the desired balance of properties.

The polyfunctional polymerisable olefinic compound is preferably a polyfunctional acrylic ester, for example a glycol diacrylate or trimethylolpropane triacrylate, or more preferably a polyfunctional methacrylic ester, for example a glycol dimethacrylate or in particular trimethylolpropane trimethacrylate. Mixtures of polyfunctional polymerisable olefinic compounds may be used, including mixtures of compounds of different structures. It has been found that the presence of such compounds in the wear layer provides improved cigarette burn resistance. It has further been found that such methacrylate esters may provide processing advantages over the corresponding acrylate esters during the manufacture of floor coverings according to the invention, as will be explained more particularly hereinafter. The polymer composition wear layer of the floor coverings of the invention may contain a small proportion of one or more substances known as initiators for the polymerisation of the olefinic compound, for example organic peroxides. The polymer composition wear layer may comprise 10 to 50 parts by weight of the polyfunctional polymerisable olefinic compound per 100 parts by weight ionomer resin (parts per hundred, phr), preferably 10 to 30 phr.

The polymer composition wear layer of the floor coverings of the invention is preferably essentially free from substances of the class known as simple ester plasticisers. These substances are known as plasticisers for PVC, and they include for example high-boiling alkyl phthalic and phosphoric esters. Such plasticisers have been found to exude (bleed) from ionomer resin films, and in consequence wear layers containing significant proportions of such plasticisers may be found to be undesirably slippery.

The polymer composition wear layer of the floor coverings of the invention may optionally contain hard particles, for example synthetic resin particles, to improve wear properties and slip resistance.

The polymer composition wear layer of the floor coverings of the invention may comprise one or more coloured dyestuffs. An opaque polymer composition wear layer may comprise about 0.1 to about 10, often about 1 to about 5, percent by weight of coloured particles such as pigments and dyed or pigmented fibres or flakes. Such an opaque polymer composition preferably includes little or no filler.

The polymer composition wear layer may consist essentially of the ionomer resin and the polyfunctional polymerisable olefinic compound, optionally together with such hard particles and/or such coloured material.

The thickness of the wear layer of the floor coverings of the invention is preferably in the range 50 to 1000 micron, more preferably 250 to 750 micron. The polymer composition wear layer of the floor covering of the invention may be formed by powder coating or dispersion coating but it is preferably an extruded or calendered film, more preferably an extruded film. The wear layer may consist of a single film or of two or more such films laminated together. If two or more films are used, such films may be the same or different. The upper surface of the wear layer may be embossed.

When the wear layer is transparent or translucent, the decorative layer of the floor coverings of the invention may be printed with a decorative pattern, which may be preferred, or may be a solid-coloured layer. When a printed layer is used it may be based on any suitable type of printable transparent film, for example an acrylic or ionomer film. The thickness of this film is preferably in the range 25 to 125 micron. Such a printed patterned layer is preferably based on an extruded film. The printed side of the printed patterned layer may be disposed towards or away from the wear layer. When a solid-coloured layer is used, it may be based on a film as described hereinbefore for a printed layer or it may be a solid-coloured face ply layer as described hereinafter.

The polymer composition wear layer and the decorative layer require to be bonded (laminated) together. The surfaces to be bonded together may be activated beforehand, for example by exposure to a corona discharge or flame treatment. In one embodiment of the method of the invention, the wear layer and the decorative layer are bonded together by hot (thermal) lamination. This embodiment may be generally satisfactory when the decorative layer is an ionomer film but may be less satisfactory in other cases. In another embodiment of the method of the invention, the wear layer and the decorative layer are bonded together by means of an adhesive interlayer. Use of such an adhesive interlayer is generally preferred when the decorative layer is not an ionomer film but is for example an acrylic film.

In one version of this latter embodiment, the adhesive interlayer is a thin layer of a suitable liquid adhesive, for example a liquid urethane adhesive. A liquid urethane adhesive is preferably based on an aliphatic isocyanate, because such urethane adhesives have good clarity and possess good resistance to yellowing when exposed to UV light. The adhesive layer is preferably as thin as possible consistent with the formation of a uniform bond between the wear layer and the decorative layer. The adhesive layer is generally applied at a rate of about 5 to 50 g/m$^2$ (dry film weight), corresponding to a thickness of about 4 to 40 micron.

In another version of this latter embodiment, the adhesive interlayer is an extruded film having good lamination and adhesion properties both to the ionomer resin wear layer and to the decorative layer. The extruded interlayer film is preferably as thin as possible consistent with ease of manufacture and with good lamination properties, and it is generally no more than about 75 micron thick, preferably no more than about 50 micron thick, more preferably no more than about 25 micron thick. The extruded interlayer film may for example be an extruded polyurethane film, and it is preferably a co-extruded film containing a layer of polyethylene or similar material bonded to a layer of polyurethane. Upon lamination, the polyethylene layer bonds well to the ionomer resin layer and the polyurethane layer bonds well to the acrylic layer. The polyurethane is preferably based on an aliphatic isocyanate to provide good clarity and resistance to UV light.

In a further alternative embodiment of the method of the invention, a co-extruded film consisting of a polymer composition layer and an adhesive layer is used. The adhesive layer may for example be a polyurethane layer, preferably an aliphatic polyurethane. The polymer composition layer serves to provide the wear layer in the floor covering as described hereinabove. The adhesive layer is adhered to the decorative layer by hot lamination. The adhesive layer is preferably no more than about 50 micron thick, more preferably no more than about 25 micron thick.

It is thought that thermal processing, for example extrusion and hot lamination, initially induces some degree of grafting of the polyfunctional olefinic compound onto the ionomer resin, and subsequently induces crosslinking. It is further thought that this grafting and crosslinking may be the origin of the good cigarette burn resistance generally observed in the floor coverings of the invention. It has surprisingly and advantageously been found that in general it is not necessary to take special steps to induce polymerisation of the polymerisable olefinic compound during the manufacture of the floor coverings of the invention, especially if it is a methacrylate ester. For example, it is known that polymerisation of such polymerisable olefinic compounds can be initiated or accelerated by exposure to actinic radiation, for example UV light or an electron beam. The method of the invention preferably does not include the step of exposing the floor covering to actinic radiation.

The polymer composition wear layer may be manufactured by reactive extrusion, in which the ionomer resin is extruded through an extruder into which the polymerisable olefinic compound is injected. Care should be taken to avoid excessive reaction in the extruder, as this may lead to early crosslinking and consequent difficulties in processing. Care should also be taken to ensure that some reaction takes place in the extruder, otherwise the olefinic compound may exude from the extruded sheet at the point of extrusion or on storage. The degree of reaction in the extruder may readily be controlled by suitable variation of temperature, residence time, olefinic compound, injection point, proportion of polymerisation initiator in the composition, and the like. Further reaction can be induced by thermal treatment subsequent to extrusion, for example calendering, or by exposure to microwave or IR radiation.

Especially when the wear layer is transparent or translucent, the floor coverings of the invention preferably comprise a face ply layer adjacent to the decorative, preferably printed patterned, layer on the side remote from the wear layer. The face ply layer is preferably a calendered or extruded film. The material of the face ply layer is generally a thermoplastic polymer resin filled with a filler such as calcium carbonate or hydrated aluminium oxide. The material may additionally comprise a pigment such as a white pigment, for example titanium dioxide, for example at about 10 parts by weight per 100 parts polymer resin. The polymer resin preferably contains no chlorine. Examples of suitable polymer resins include ethylene/vinyl acetate and ethylene/alkyl acrylate, for example methyl or butyl acrylate, copolymers. The face ply layer composition may additionally comprise one or more lubricants, for example stearic acid.

The face ply layer composition may additionally comprise a small proportion of a binder polymer such as an ethylene/alkyl acrylate/maleic anhydride terpolymer, for example about 5 to about 10 parts by weight of the binder polymer per 100 parts by weight of the polymer resin (parts per hundred, phr). In the absence of such a binder polymer, the practical maximum proportion of a filler such as calcium carbonate may be found to be about 250 or 270 phr. If higher proportions of filler are used, the mechanical properties (for example strength and resistance to cracking) of the face ply layer are adversely affected. When such a binder polymer is present in the composition, it has been found that higher proportions of the filler can be used. This is advantageous in that the filler is generally less expensive than the polymer resin. Furthermore, high levels of filler in the face ply layer provide a desirably high degree of opacity. Still further, such binder polymers may serve to promote adhesion of the face ply to adjacent layers in the floor covering. It has been found that if the proportion of the binder polymer is higher than about 10 phr, the face ply layer composition and films made therefrom may be difficult to process; for example, they may tend to stick to hot rollers.

It may be desirable to interpose an adhesive interlayer between the decorative, preferably printed patterned, layer and the face ply layer. This adhesive interlayer may be a liquid adhesive or an extruded or co-extruded film, for example as described hereinabove. It may be advantageous to activate the surface of the decorative, preferably printed patterned, layer or the face ply layer or both to improve adhesion, for example by corona discharge or flame treatment.

The floor covering of the invention may alternatively comprise a face ply layer of the type hereinbefore described serving as the decorative layer adjacent to the wear layer. In such a case, the face ply layer generally contains one or more coloured pigments. Adhesion between the wear layer and the decorative layer may be improved by use of surface treatment and/or an adhesive interlayer.

The floor coverings of the invention preferably additionally comprise a backing (lower) layer. The backing layer is preferably a calendered or extruded film. The material of the backing layer is generally a thermoplastic polymer resin filled with a filler such as calcium carbonate or hydrated aluminium oxide and preferably additionally containing a black pigment such as carbon black, for example about 1 to 3 phr carbon black. In general, the backing layer may contain about 10 to about 400 phr filler. The polymer resin preferably contains no chlorine. Examples of suitable polymer resins include ethylene/vinyl acetate and ethylene/alkyl acrylate, for example methyl or butyl acrylate, copolymers. The backing layer composition may additionally comprise one or more lubricants, for example stearic acid. The amount of filler is chosen to provide a floor covering which has a low tendency to curl. For example, the backing layer composition may contain about 100 to about 150 phr calcium carbonate. The backing layer preferably has a roughened lower surface. For example, it may be imprinted with the pattern of a canvas mesh belt.

The floor coverings of the invention may additionally comprise a foam layer, for example a polyurethane foam layer, above the backing layer. Such floor coverings are known as cushion flooring.

The floor coverings of the invention as a whole preferably contain essentially no chlorine.

The floor coverings of the invention may be manufactured by hot lamination of all the individual films between heated rollers in a multi-stage or preferably a single-stage operation. The lamination temperature depends to some extent on the nature of the materials of which the films are composed, but it may generally be in the range 120° to 170° C. The floor coverings may alternatively be manufactured by other known methods, for example compression moulding. Particularly when the wear layer is transparent or translucent and the decorative layer is a solid-coloured layer or when the wear layer is opaque, the floor coverings may be made by co-extrusion.

A particularly preferred form of construction for a floor covering according to the invention is a laminate of films in the following sequential order, optionally separated by adhesive interlayers as described hereinabove:

(1) extruded polymer composition film containing or consisting essentially of an ionomer resin and a polyfunctional polymerisable olefinic compound such as trimethylolpropane trimethacrylate (TMPTMA);

(2) printed patterned layer as decorative layer;

(3) face ply layer; and (4) backing layer.

The floor coverings of the invention possess excellent resistance to abrasion, scratching, scuffing, indentation and staining. They possess good burn resistance, for example when a lit cigarette is stubbed out on the wear layer or allowed to smoulder on the wear layer. They contain very low amounts of volatile organic materials. They possess excellent optical clarity, are free from yellowness and resist yellowing when exposed to the normal amounts of UV light encountered in interior environments. The visual appearance of a decorative layer, preferably having a printed pattern, through a transparent or translucent wear layer in the floor coverings of the invention is considerably more clear and less dull in comparison with the appearance of the printed pattern in conventional vinyl floor coverings. The floor coverings of the invention may be used in sheet or tile form.

The invention is illustrated by the following Examples, in which parts and proportions are by weight unless otherwise specified:

EXAMPLE 1

A floor tile was prepared by laminating together the following sequence of films:

(1) extruded ionomer resin composition film 150 micron thick, in which the ionomer resin was a zinc-containing ionomer resin available from Du Pont under the Trade Mark "Surlyn 9910", and the composition contained 15 parts trimethylolpropane trimethacrylate (TMPTMA) per 100 parts ionomer resin;

(2) ionomer resin film as (1);

(3) ionomer resin film as (1) except that it was 75 micron thick;

(4) extruded acrylic film 75 micron thick printed with a decorative pattern;

(5) face ply 1 mm thick consisting of 100 parts ethylene/methyl acrylate copolymer resin available from Elf Atochem under the Trade Mark "Lotryl 18MA02", 5 parts ethylene/acrylic ester/maleic anhydride terpolymer binder resin available from Elf Atochem under the Trade Mark "Lotader 4700", 275 parts calcium carbonate as filler, and 10 parts titanium dioxide as white pigment.

(6) backing layer 1 mm thick consisting of 100 parts Lotryl 18MA02, 135 parts calcium carbonate as filler and 2 parts carbon black.

The surface of (3) to be bonded to (4) and the surface of (4) to be bonded to (5) were subjected to corona discharge so that the surface tension of the treated surface assessed by measuring the spreading of coloured inks was at least 40 dynecm$^{-1}$. The treated surfaces were coated with 25 g/m$^2$ dry film weight of a liquid aliphatic urethane adhesive before lamination. The films were laminated together by passage at a speed of 4 m/min between rollers heated to 130° C., and the resulting laminate was passed over chill rollers and collected on a reel.

The tile produced had the following properties, measured according to British Standard 3261 where applicable, compared with those of a commercial resilient vinyl floor tile:

|  | Ionomer Resin | PVC |
| --- | --- | --- |
| Taber abrasion (weight loss g/1000 cycles) | 0.03 | 0.19 |
| Taber scratch (g/1.25 mm) | 500 | 500 |
| Curl | Pass | Pass |
| Ply adhesion | Pass | Pass |
| Elastic product (Nm$^{-2}$) | 12 | 15 |
| Residual indentation (micron) | 0 | 50 |

-continued

|  | Ionomer Resin | PVC |
| --- | --- | --- |
| Scuff resistance | Better | Standard |
| Staining — curry powder | B | D |
| Staining — boot polish | B | D |
| Clarity | Better | Standard |
| UV resistance | Better | Standard |

In the Taber scratch test, the ionomer resin surface was merely marked, but material was removed from the surface of the PVC. Residual indentation was measured to the nearest thousandth of an inch (25 micron). Staining was assessed on a scale of A (no stain) to E (badly stained).

EXAMPLE 2

Ionomer resin (Surlyn 9910) was worked in a calender mill in which the roll temperatures were 165°–170° C. and 145°–150° C. The rollers were coated with a small amount of a lubricant to prevent sticking. Different known amounts of trimethylolpropane trimethacrylate (TMPTMA) were drip-fed into the molten mass which was then removed from the rolls in the form of a clear film approximately 0.5 mm thick, suitable for use as the wear layer of a resilient floor tile. The properties of the films were assessed and the following results obtained:

| Sample | TMPTMA phr | Shore D Hardness | Taber Abrasion g/1000 cycles | Taber Scratch mm @ 500 g | Coin Scratch |
| --- | --- | --- | --- | --- | --- |
| A | 0 | 51.5 | 0.026 | 1.52 | superb |
| B | 10 | 54.0 | 0.022 | 1.65 | superb |
| C | 15 | 55.5 | 0.034 | 1.27 | superb |
| D | 20 | 56.5 | 0.031 | 1.52 | superb |
| E | 30 | 55.5 | 0.031 | 1.91 | superb |
| F | 40 | 63.0 | 0.079 | 1.91 | superb |

The amount of TMPTMA is expressed as parts per 100 parts ionomer resin. The Taber Scratch measurement was that of scratch width at the specified loading. In samples A and B, the surface was only lightly marked, whereas in samples C–F marking was more severe with some loss of material from the surface. The samples with higher levels of TMPTMA had a much harder feel than that of the control, and sample F was relatively brittle.

The films were optionally exposed to electron beam radiation (6 Mrad), and the cigarette burn properties (stub test) of the untreated and treated samples were assessed. The following results were obtained:

| Sample | Untreated | Electron-beam treated |
| --- | --- | --- |
| A | Poor, black charring. Very similar to standard formulation PVC. | Similar to untreated, but charring less noticeable. |
| B | Area of degradation similar to A, although smaller area of charring, approx. 50% of damaged area. Remaining area translucent. | Similar to untreated |
| C | Area of degradation similar to A but | Similar to untreated |

-continued

| Sample | Untreated | Electron-beam treated |
|---|---|---|
| | less charring, approx. 25% of damaged area. Remaining area translucent. | |
| D | Similar to C | Similar to untreated |
| E | Area of degradation slightly less than A, but very little charring. Good result. | Not tested |
| F | Area of degradation further reduced, practically no charring. Very good result. | Not tested |

It will be observed that exposure to electron-beam radiation made essentially no difference to cigarette burn resistance.

Samples of D and E (which had not been exposed to the electron beam treatment) were conditioned at 165° C. for up to 120 minutes. For sample D, cigarette burn resistance improved considerably after 30 or 60 minutes' conditioning, without any change in film colour. After longer conditioning, no further improvement in cigarette burn resistance was observed, and there was some degree of yellowing. For sample E, cigarette burn resistance was improved by 30 minutes' conditioning without any change in colour. No further improvement was noted after 60 minutes and some yellowness was evident.

We claim:

1. A resilient floor covering comprising a polymer composition wear layer laminated to at least one underlying layer, wherein said polymer composition wear layer comprises a polymerization product of
   a) an ionomer resin which is the co-polymerization product of α,β-unsaturated carboxylic acid and an olefin, wherein the carboxylic acid groups of said acid are at least partially neutralized by salt formation with metal ions; and
   b) a polyfunctional polymerizable olefinic compound.

2. The floor covering of claim 1, wherein said polyfunctional polymerizable olefinic compound consists essentially of at least one compound selected from the group consisting of polyfunctional acrylic esters and polyfunctional methacrylic esters.

3. The floor covering of claim 2, wherein said polyfunctional polymerizable olefinic compound consists essentially of trimethylolpropane trimethacrylate.

4. The floor covering of claim 1, wherein said polyfunctional polymerizable olefinic compound is present in said polymer composition in an amount of 10 to 50 parts by weight per 100 parts by weight of said ionomer resin.

5. The floor covering of claim 4, wherein said polyfunctional polymerizable olefinic compound is present in said polymer composition in an amount of 10 to 30 parts by weight per 100 parts by weight of said ionomer resin.

6. The floor covering of claim 1, wherein said polymer composition wear layer is in the form of at least one extruded film.

7. The floor covering of claim 1, wherein the thickness of said wear layer is in the range of 50 to 1000 microns.

8. The floor covering of claim 7, wherein the thickness of said wear layer is in the range of 250 to 750 microns.

9. The floor covering of claim 1, wherein said polymer composition wear layer is transparent and overlies a decorative layer.

10. The floor covering of claim 1, wherein said polymer composition wear layer is translucent and overlies a decorative layer.

11. The floor covering of claim 9, comprising a laminate of films in the following sequential order:
    a) as said wear layer, at least one extruded polymer composition film which comprises the polymerization product of said ionomer resin and said polyfunctional polymerizable olefinic compound;
    b) as said decorative layer, a printed patterned layer;
    c) a face ply layer; and
    d) a backing layer.

12. The floor covering of claim 11, wherein said polymer composition is an opaque composition which further contains 0.1 to 10 percent colored particles by weight of said composition.

13. The resilient floor covering of claim 1, wherein said floor covering additionally comprises a face ply layer, said face ply layer comprising a composition which comprises a thermoplastic polymer resin, a filler and a binder polymer.

14. The resilient floor covering of claim 13, wherein said thermoplastic polymer resin is selected from the group consisting of ethylene/vinyl acetate copolymers and ethylene/alkyl acrylate copolymers.

15. The resilient floor covering of claim 13, wherein said binder polymer is an ethylene/alkyl acrylate/maleic anhydride terpolymer.

16. The resilient floor covering of claim 13, wherein said binder polymer is present in said composition in an amount of 5 to 10 parts by weight per 100 parts by weight of said thermoplastic polymer resin.

17. The resilient floor covering of claim 13, wherein a filler is present in said composition in an amount of at least 250 parts by weight per 100 parts by weight of said thermoplastic polymer resin.

18. A method of manufacturing the resilient floor covering of claim 11, comprising the step of laminating said wear layer to said at least one underlying layer, wherein said wear layer is in the form of at least one film made from said polymerization product.

19. The method of claim 18, wherein the polyfunctional polymerizable olefinic compound present in said polymerization product is adapted to be cured by thermal processing without exposure to actinic radiation.

20. The method of claim 18, wherein layers arranged in the following sequence:
    a) as said wear layer, at least one extruded polymer composition film which comprises the polymerization product of said ionomer resin and said polyfunctional polymerizable olefinic compound;
    b) a decorative printed patterned layer;
    c) a face ply layer; and
    d) a backing layer are thermally laminated together in a single-stage process, thereby forming said floor covering.

21. The method of claim 18, wherein said floor covering additionally comprises at least one adhesive interlayer disposed between at least one adjacent pair of layers.

* * * * *